(12) United States Patent
Hales et al.

(10) Patent No.: US 10,410,537 B2
(45) Date of Patent: Sep. 10, 2019

(54) UNMANNED VEHICLE SIMULATION

(71) Applicant: Insitu, Inc., Bingen, WA (US)

(72) Inventors: Simon Anthony Hales, White Salmon, WA (US); Theodore Terris Trowbridge, Hood River, OR (US)

(73) Assignee: INSITU, INC., Bingen, WA (US)

( * ) Notice: Subject to any disclaimer, the term of this patent is extended or adjusted under 35 U.S.C. 154(b) by 217 days.

(21) Appl. No.: 14/453,555

(22) Filed: Aug. 6, 2014

(65) Prior Publication Data

US 2015/0064658 A1    Mar. 5, 2015

Related U.S. Application Data

(60) Provisional application No. 61/872,243, filed on Aug. 30, 2013.

(51) Int. Cl.
*G09B 9/08*    (2006.01)
*G09B 9/02*    (2006.01)
*G09B 9/48*    (2006.01)

(52) U.S. Cl.
CPC ............... *G09B 9/08* (2013.01); *G09B 9/02* (2013.01); *G09B 9/48* (2013.01)

(58) Field of Classification Search
CPC ... G09B 9/02; G09B 9/08; G09B 9/48; G06Q 10/10; G05D 1/0061; G08G 5/0034
USPC .................................. 434/30, 219; 701/2, 3
See application file for complete search history.

(56) References Cited

U.S. PATENT DOCUMENTS

| 2001/0030667 | A1* | 10/2001 | Kelts ..................... | G06F 3/0481 715/854 |
| 2006/0234199 | A1* | 10/2006 | Walker ..................... | G09B 5/00 434/323 |
| 2009/0112388 | A1 | 4/2009 | Yeager et al. | |
| 2009/0177385 | A1* | 7/2009 | Matas ................. | G01C 21/3614 701/533 |
| 2010/0003652 | A1* | 1/2010 | Lavie ..................... | G06Q 10/10 434/219 |
| 2010/0146436 | A1* | 6/2010 | Jakobson ........... | G01C 21/3682 715/800 |
| 2011/0093950 | A1* | 4/2011 | Bhargava ................ | G06F 21/52 726/21 |
| 2011/0184590 | A1* | 7/2011 | Duggan ............... | G05D 1/0061 701/2 |
| 2012/0151553 | A1* | 6/2012 | Burgess ................. | G06F 21/00 726/1 |

(Continued)

FOREIGN PATENT DOCUMENTS

DE    102009051644 A1    5/2011
WO    WO 2013/033723 A2    3/2013

OTHER PUBLICATIONS

"CAE Simfinity—Suite of training devices"; CAE; www.cae.com/en/military/_pdf/datasheet.simfinity.pdf; accessed Mar. 14, 2011; 2 pages.

(Continued)

*Primary Examiner* — Eddy Saint-Vil
(74) *Attorney, Agent, or Firm* — Gates & Cooper LLP

(57) ABSTRACT

A system for simulating a vehicle may include a designing tool for configured for a vehicle simulation and a simulation tool for controlling simulation characteristics of the vehicle. A method for simulating an object may include displaying a map of a region, displaying a plurality of actions operative on a simulated object, and performing a selected action.

16 Claims, 11 Drawing Sheets

(56) References Cited

U.S. PATENT DOCUMENTS

| | | | | |
|---|---|---|---|---|
| 2012/0280087 | A1* | 11/2012 | Coffman | G05D 1/0016 244/175 |
| 2012/0308965 | A1* | 12/2012 | Andrews | G09B 9/08 434/30 |
| 2012/0331472 | A1* | 12/2012 | Moon | G06F 17/30241 718/102 |
| 2013/0096819 | A1* | 4/2013 | Tarnok | G01C 21/00 701/428 |
| 2014/0018979 | A1* | 1/2014 | Goossen | G08G 5/0034 701/3 |

OTHER PUBLICATIONS

"Insitu UAS Incorporates MetaVR Visuals"; www.metavr.com/casestudies/insitu_uas.html; accessed Jun. 1, 2015; 2 pages.

International Patent Application No. PCT/US2014/053226; Int'l Search Report and the Written Opinion; dated May 8, 2015; 12 pages.

International Patent Application No. PCT/US2014/053226; Int'l Preliminary Report on Patentability and Written Opinion; dated Mar. 10, 2016; 7 pages.

International Patent Application No. PCT/US2014/053074; Int'l Preliminary Report on Patentability and Written Opinion; dated Mar. 10, 2016; 7 pages.

Australian Office Action dated Jan. 31, 2018 for Australian Patent Application No. 2014349141.

Australian Office Action dated Mar. 1, 2018 for Australian Patent Application No. 2014349141.

Australian Examination Report dated Oct. 5, 2018 for Australian Patent Application No. 2014349143.

Australian Examination Report dated Nov. 6, 2018 for Australian Patent Application No. 2014349141.

Canadian Office Action dated Nov. 30, 2018 for Canadian Patent Application No. 2,920,366.

Canadian Office Action dated Nov. 30, 2018 for Canadian Patent Application No. 2,920,301.

* cited by examiner

FIG. 8

UNMANNED VEHICLE SIMULATION

CROSS REFERENCE TO RELATED APPLICATIONS

This application claims benefit under 35 U.S.C. § 119(e) of U.S. Provisional Patent Application No. 61/872,243, filed Aug. 30, 2013, the contents of which are incorporated herein by reference in their entireties.

BACKGROUND

The present application is generally related to the use of unmanned aerial vehicles (UAVs).

Usage of unmanned aerial vehicles (UAVs) is becoming much more common UAVs are used by many organizations, such as the military, law enforcement, and the like, and by individuals, such as UAV enthusiasts. UAV control typically includes a controller operating at a control system. The control system accepts inputs from the controller and transmits information wirelessly to a UAV in flight. The UAV can respond to the signals sent by the control system to change operation of the UAV, such as by changing a flight path, changing an elevation, releasing payload (e.g., a weapon), changing operation of payload (e.g., a camera or sensor), and the like. Control of a UAV can be difficult, and a simulator that simulates control of a UAV can help to reduce costs and minimize risks during UAV operator training. A simulator can allow UAV operators to train in real-time to operate UAVs. A simulator may provide a virtual environment that is realistic but without the cost and risks of a real flight with a live UAV.

SUMMARY

Illustrative examples of the present disclosure include, without limitation, methods, structures, and systems. In one aspect, a method of simulating a launch of an unmanned air vehicle can include providing an interface for a user selectable launch option for a plurality of simulation modes, and responsive to a user input at the interface, simulating a launch of an unmanned air vehicle into an orbit using a predefined launch model and orbit parameters.

In another aspect, a system for simulating an unmanned vehicle can include a designing tool and a simulation tool. The designing tool can be configured to define one or more routes for an unmanned vehicle simulation. The routes may comprise a plurality of obstacles or terrains and a number of waypoints. The simulation tool can also be configured to control simulation characteristics of the unmanned vehicle or any of the entities or aspects configured by the designing tool. The simulation characteristics may comprise a speed or altitude and a land or air type vehicle or a model of the vehicle.

In another aspect, a method of simulating an object can include displaying a map of a region, responsive to a single user input selecting a location on the map, displaying a plurality of actions operative on a simulated object, and performing a selected action from the plurality of actions.

Other features of the methods, structures, and systems are described below. The features, functions, and advantages can be achieved independently in various examples or may be combined in yet other examples, further details of which can be seen with reference to the following description and drawings.

BRIEF DESCRIPTION OF THE DRAWINGS

Throughout the drawings, reference numbers may be re-used to indicate correspondence between referenced elements. The drawings are provided to illustrate examples described herein and are not intended to limit the scope of the disclosure.

FIG. 8 depicts an example user interface for providing user feedback.

DETAILED DESCRIPTION OF ILLUSTRATIVE EXAMPLES

Figure 1:
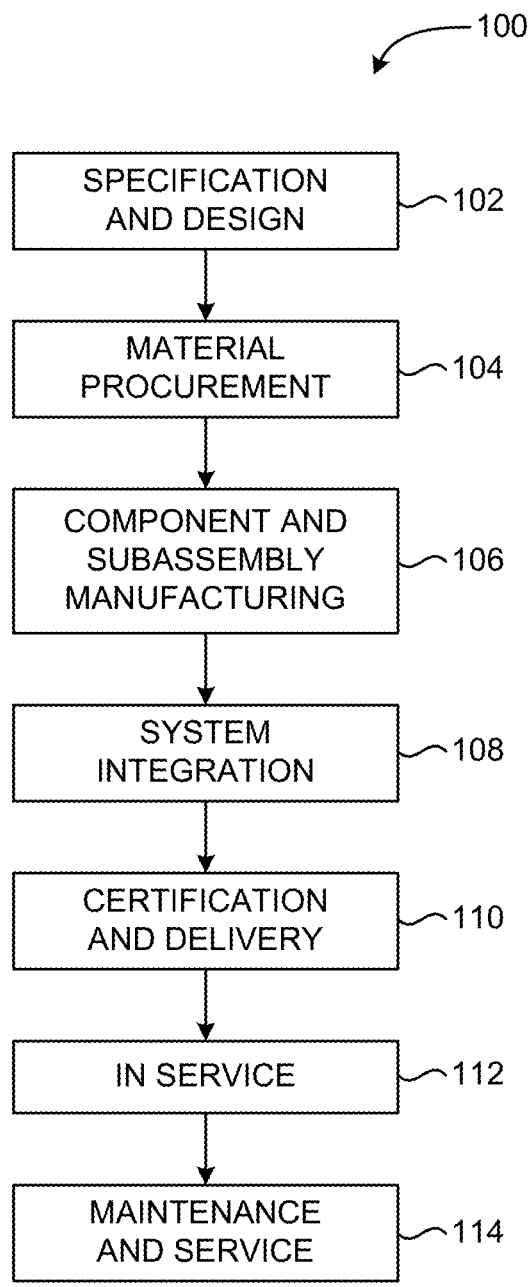
FIG. 1 depicts a flow diagram of an aircraft production and service methodology.
Figure 2:
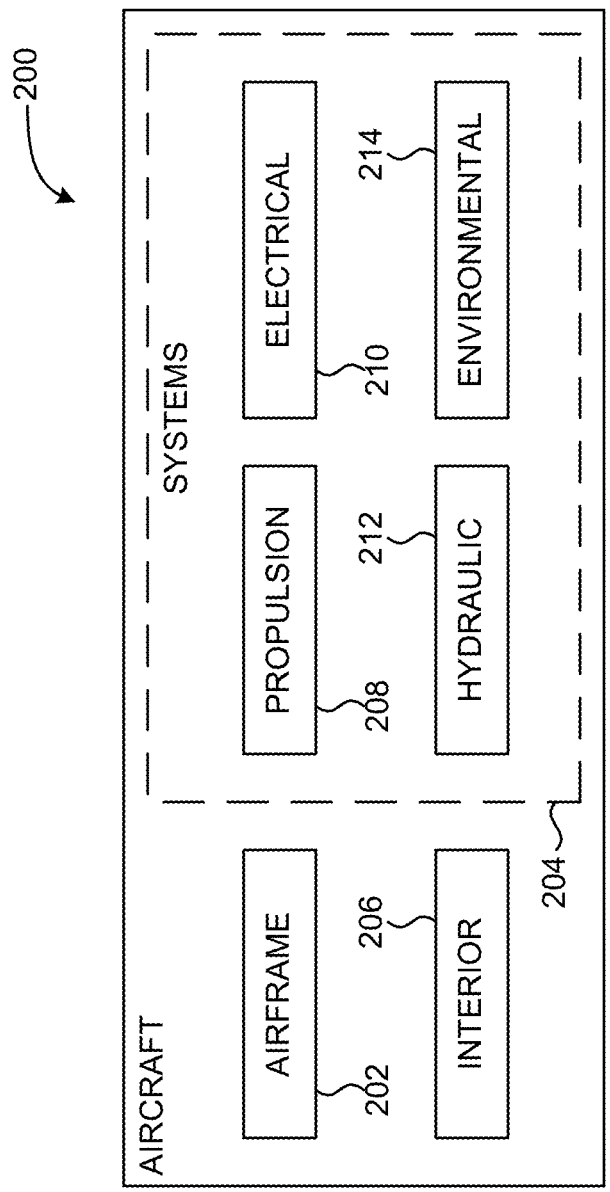
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
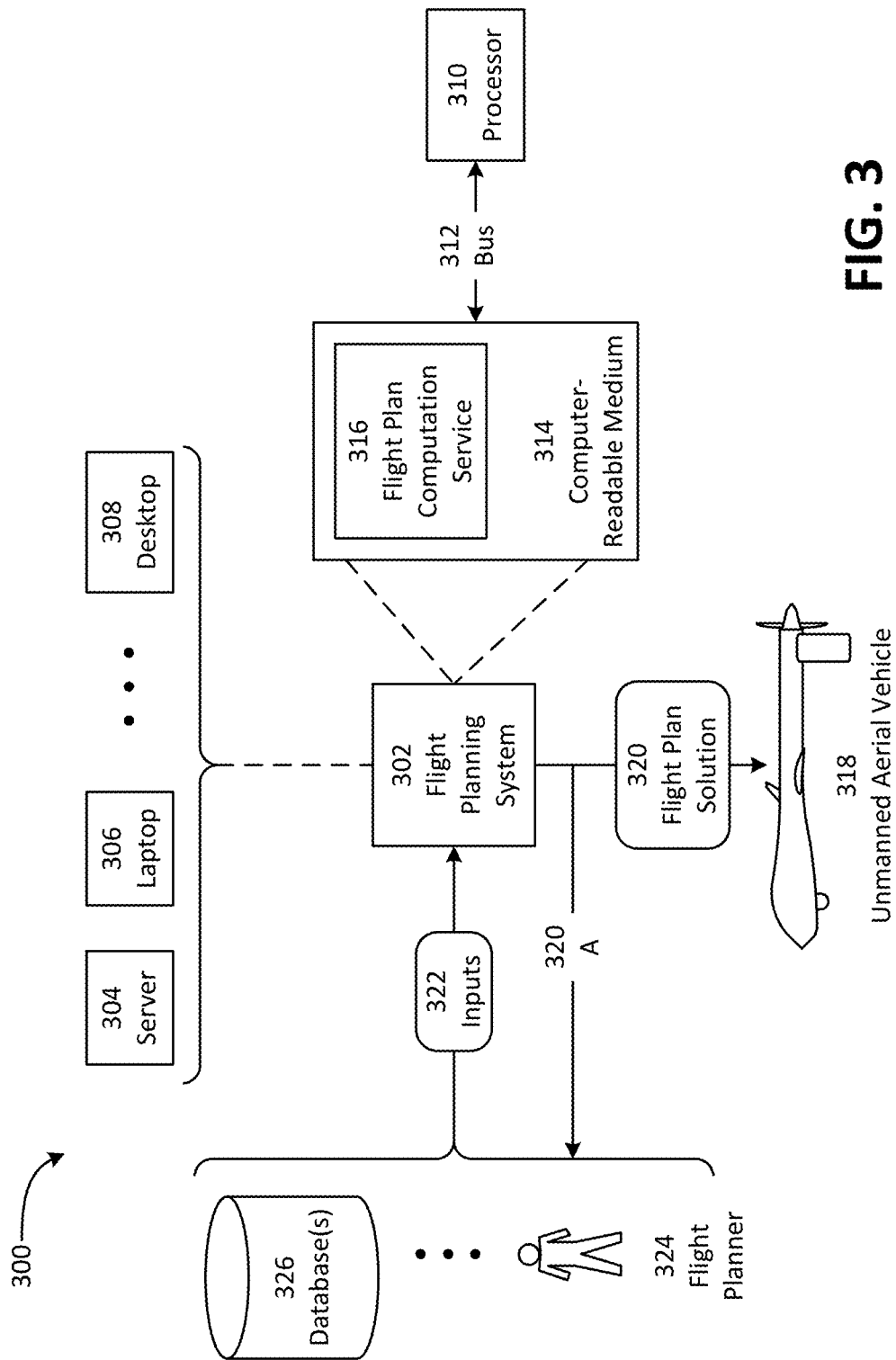
FIG. 3 depicts a block diagram illustrating systems or operating environments for controlling unmanned aerial vehicles (UAVs).

FIG. 3 illustrates systems or operating environments, denoted generally at 300, that provide flight plans for UAVs while routing around obstacles having spatial and temporal dimensions. These systems 300 may include one or more flight planning systems 302. FIG. 3 illustrates several examples of platforms that may host the flight planning system 302. These examples may include one or more server-based systems 304, one or more portable computing systems 306 (whether characterized as a laptop, notebook, tablet, or other type of mobile computing system), and/or one or more desktop computing systems 308. As detailed elsewhere herein, the flight planning system 302 may be a ground-based system that performs pre-flight planning and route analysis for the UAVs, or may be a vehicle-based system that is housed within the UAVs themselves.

Implementations of this description may include other types of platforms as well, with FIG. 3 providing non-limiting examples. For example, the description herein contemplates other platforms for implementing the flight planning systems, including but not limited to wireless personal digital assistants, smartphones, or the like. The graphical elements used in FIG. 3 to depict various components are chosen only to facilitate illustration, and not to limit possible implementations of the description herein.

Turning to the flight planning system 302 in more detail, it may include one or more processors 310, which may have a particular type or architecture, chosen as appropriate for particular implementations. The processors 310 may couple to one or more bus systems 312 that are chosen for compatibility with the processors 310.

The flight planning systems 302 may include one or more instances of computer-readable storage media 314, which couple to the bus systems 312. The bus systems may enable the processors 310 to read code and/or data to/from the computer-readable storage media 314. The media 314 may represent storage elements implemented using any suitable technology, including but not limited to semiconductors, magnetic materials, optics, or the like. The media 314 may include memory components, whether classified as RAM, ROM, flash, or other types, and may also represent hard disk drives.

The storage media 314 may include one or more modules 316 of instructions that, when loaded into the processor 310 and executed, cause the system 302 to provide flight plan computation services for a variety of UAVs 318. These modules may implement the various algorithms and models described and illustrated herein.

The UAVs 318 may be of any convenient size and/or type as appropriate for different applications. In different scenarios, the UAVs may range from relatively small drones to relatively large transport aircraft. Accordingly, the graphical illustration of the UAV 318 as shown in FIG. 1 is representative only, and is not drawn to scale.

The flight plan services 316 may generate respective flight plan solutions 320 for the UAVs 318 based on inputs 322, with flight planning personnel 324 and/or one or more databases 326 providing inputs 322.

Assuming that the flight plan services 316 define one or more solutions 320, the flight planning system 302 may load the solutions into the UAVs 318, as represented by the arrow connecting blocks 302 and 318 in FIG. 3. In addition, the flight planning system 302 may also provide the solutions 320 to the flight planner 324 and/or the databases 326, as denoted by the arrow 320A.

Figure 4:
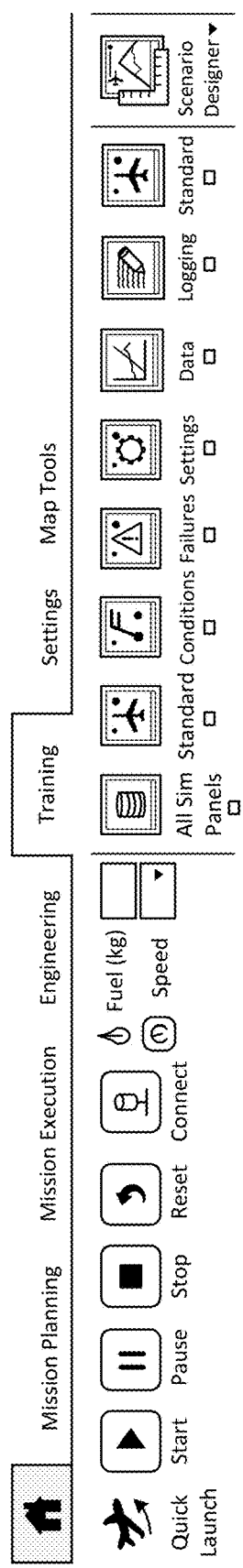
FIG. 4 depicts an example user interface for providing a quick launch function.

FIG. 4 depicts an example of a user interface for implementing a quick launch feature. Flight simulation is useful for providing training scenarios to operators of ground control systems. During initial launch of a simulated flight, the operator will typically have to go through a series of steps and procedures prior to launch of the flight. For example, such procedures may include simulated checks for the ground control station, links to ground equipment and radios, code to simulate autopilot and payloads, and so on. The simulation may be designed to provide the look and feel of a real flight scenario, and thus the operator may have to perform procedures such as turning on the UAV, turning on radios, starting the engine, etc.

However, in many training scenarios, the operator may want to focus a training session on training in the air or some specific segment without having to go through the setup procedures. In one example, a quick launch feature may be provided to automate processes and speed up certain procedures so that the procedures can be performed without further user intervention and/or faster than real-time.

In one example, the quick launch feature may allow the operator to group a series of operational steps and to quickly begin a simulation session at a chosen point. The grouped operational steps may be performed automatically and may additionally be performed faster than real-time until the chosen point is reached. The quick launch feature thus allows for more efficient training, testing, and mission planning scenarios by allowing users to skip various time-consuming processes of launching the aircraft.

In some examples, the quick launch feature may allow the user to select specific points to jump to. Additionally, the quick launch feature may provide one or more default predefined points. In some examples, the predefined points may include all of the steps required to bring the simulated flight to a specified altitude.

In one example, the state of the quick launch feature may be displayed to the user as the steps for performed. For example, the user may view the following sequence:
Starting Sim
Waiting for simulation to start
Starting Aircraft
Waiting for Aircraft to start
Selecting Aircraft
Waiting for parameter files
Setting fuel mass By rendering the states of the quick launch feature rather than jumping to the selected start point, a trainee may be able to view the steps as they are completed on the screen, and thus be better able to understand the progression of how to launch a vehicle.

Another useful aspect of the quick launch feature is its role in automated regression testing. When implementing the quick launch feature, many or all of the code paths to launch an aircraft (for example, the autopilot code, the various controllers in the ground station software, the components communicating to embedded devices, etc.) need to work correctly. A software build process may include running a build through the quick launch feature, allowing for a quicker verification of new software builds without manually performing full procedural steps to verify functionality.

Accordingly, the quick launch feature may be used to (1) allow a trainee to skip the launch procedures to concentrate on in-flight training, (2) allow a developer to test code in flight without going through all the launch procedures, and (3) allow automated build verification testing.

In some examples, a simulation scenario designer function can be provided in a UAV simulation system. In many cases it may be desirable to provide a training capability in the operational ground control station to provide training to UAV operators and trainees without expensive scenario generation software. A simulation scenario designer function may be directly built in to the ground control system. In some examples, map data such as Google Earth™ may be used to provide geographical information.

Figure 5:
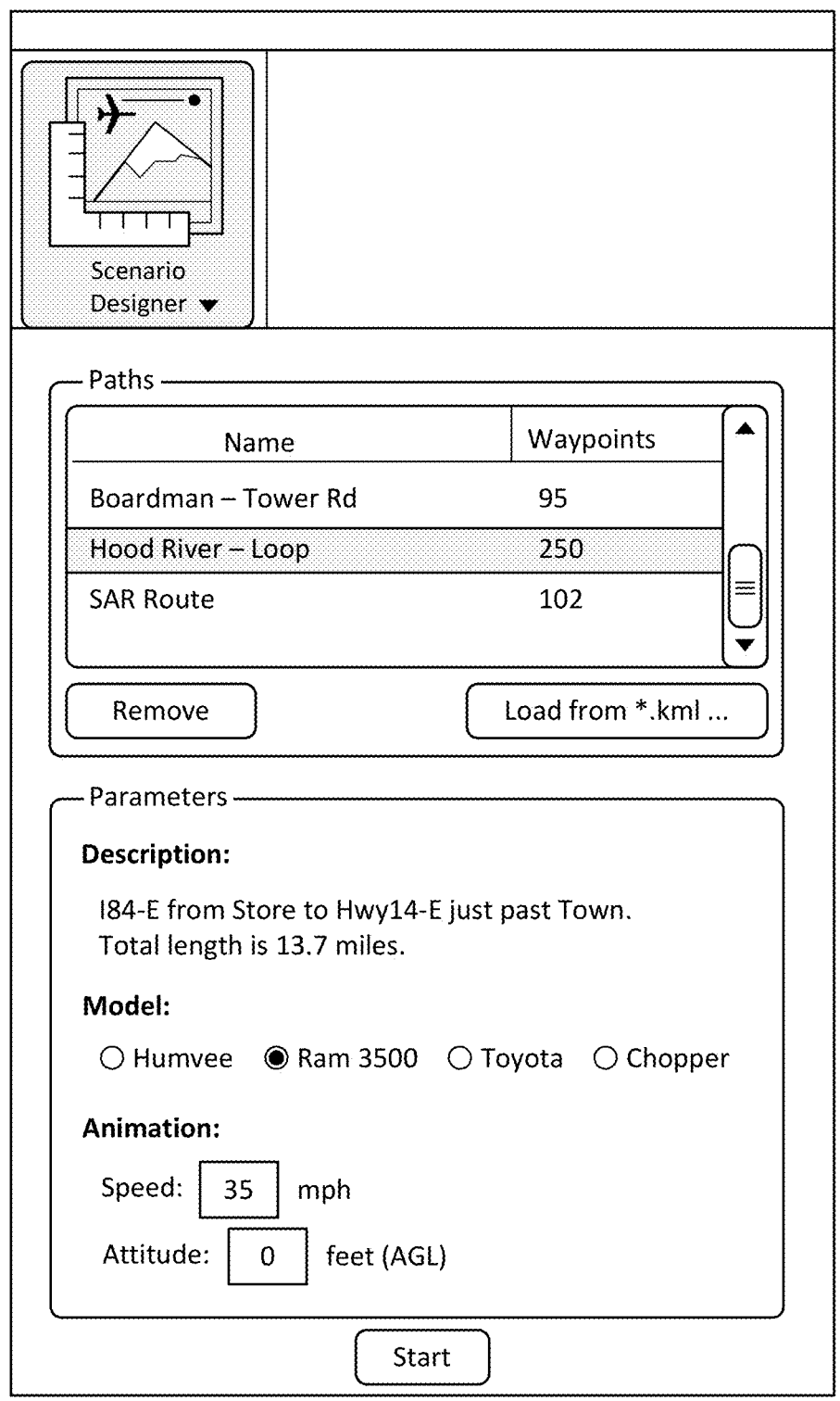
FIG. 5 depicts an example user interface for providing a scenario design function.
Figure 6:
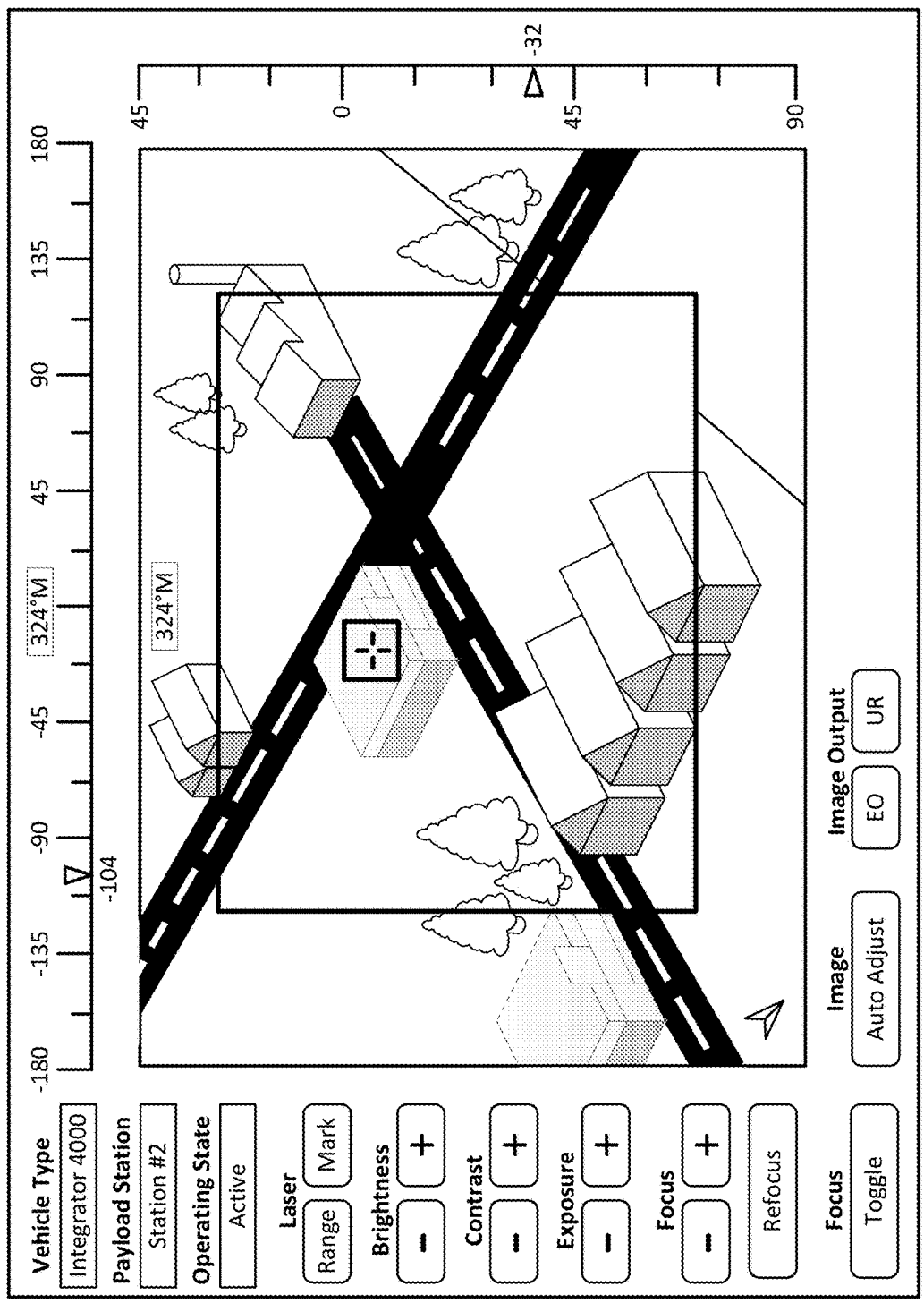
FIG. 6 depicts an example user interface for providing a scenario design function.

FIG. 5 depicts an example of a simulation scenario designer function. As shown, a user interface for providing a simulation scenario designer function to a user may allow selection of various parameters and vehicles for tracking and input of a set of waypoints. A waypoint may comprise one or more sets of coordinates that identify a point in physical space. In one example, an operator may quickly start a scenario while operating the ground control station directly without having to start a scenario using a separate simulation tool. For example, the user may generate a route for a vehicle to follow. The route may include a route name and/or a route description. In the example shown, the user can select from a helicopter, RAM truck, HUMVEE, Toyota truck, or other entities. The user may also configure the vehicle to follow the route at a designated velocity, as shown in FIG. 6.

In some examples, a point and click modification function can be provided in a UAV simulation system. In one example, the point and click modification function may provide the ability to easily and dynamically place simulation objects on a map without having to use a start-up file, use pre-defined discrete locations, or to enter coordinates. For example, the user may be able to right-click on a displayed map to update simulation objects (e.g., thermals, initial vehicle location, launch and retrieval equipment) when desired.

Figure 7:
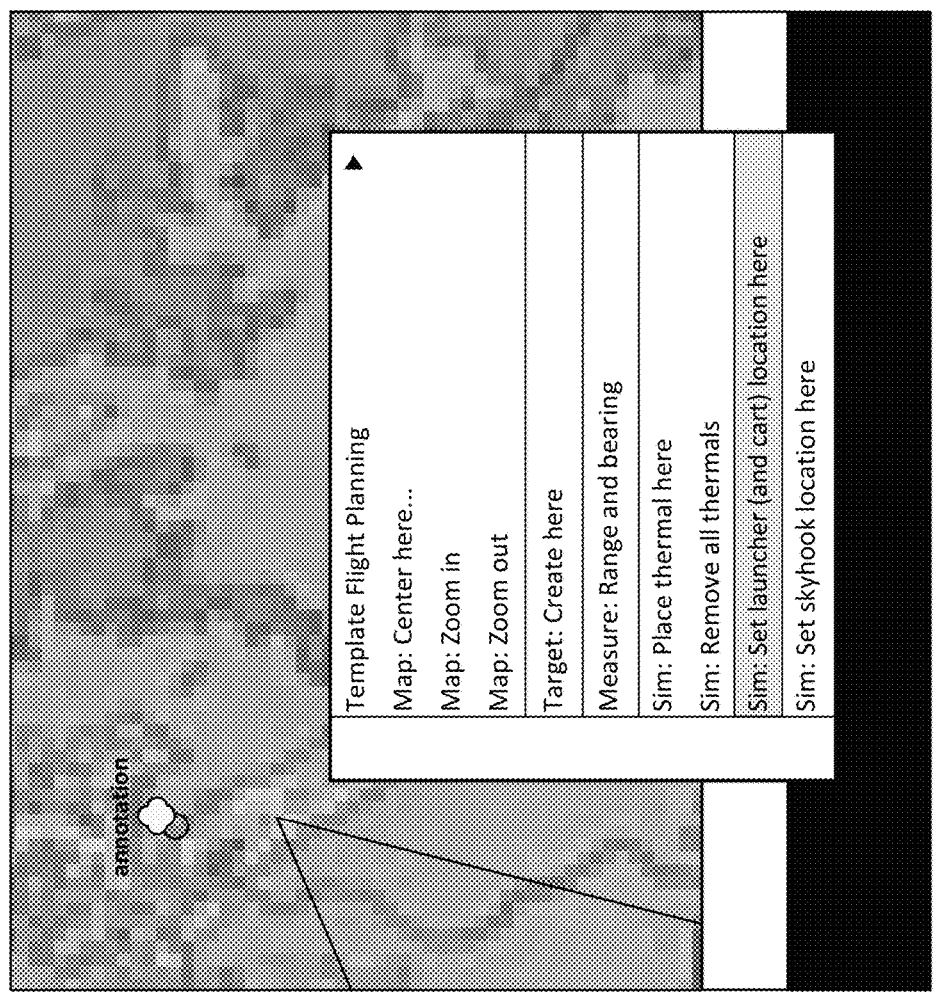
FIG. 7 depicts an example user interface for providing a point and click modification function.

Many systems require separate files to be loaded at start-up or a discrete list of location options via the UI. In some cases the coordinates of these objects or entities may have to be entered by hand. As shown in the example in FIG. 7, a user interface for a point and click modification function may provide a flexible and user friendly interface by providing a context-sensitive menu based on the selected point and current scenario. In one example, the point and click modification function may allow the user to visually select where the user wants to position the entity and select the environmental effects. As shown in FIG. 7, a map window may render satellite imagery, which the operator may use to draw waypoints and routes.

In one example, a user may right click (i.e., clicking on the right button on a mouse or other input mechanism) on a displayed map, and the point and click modification function may determine a geographic position of the cursor at the point of the right click, such as the latitude and longitude. The point and click modification function may also determine the context (e.g., whether simulation has started or not) and determine user options based on the context. The user may then be presented a menu such as the menu depicted in FIG. 7. For example, if the simulation has not started, then the user may be able to use the map to select where the simulation should take place. In some examples, predefined or default locations may be provided that the user may select to direct the simulation. Thus when configuring a simulation, the user may view a map overlay that shows simulated entities and indicates where the aircraft is situated. The simulation objects may move on the map per the simulation and the location may be tracked. The location of the object may be displayed to the user on the map, and the user may select the object again to update information, whereupon the object may be updated in real-time.

In another example, during simulation a user may view where the aircraft is currently flying, click or select another point on the map, and the point and click modification function may instantly move the current location to the selected location without the user having to wait for the aircraft to move to the new location using simulated conditions. In some examples, the user can also select predetermined locations where various events can be simulated such as aircraft system warnings or failures.

In some examples, the point and click modification function may additionally perform logic checks to determine whether a request for placement of various objects should be allowed or if the user should be provided a warning. For example, the user may not be allowed to place vehicles in rivers, or only be able to place water vessels in bodies of water, etc.

Figure 8:
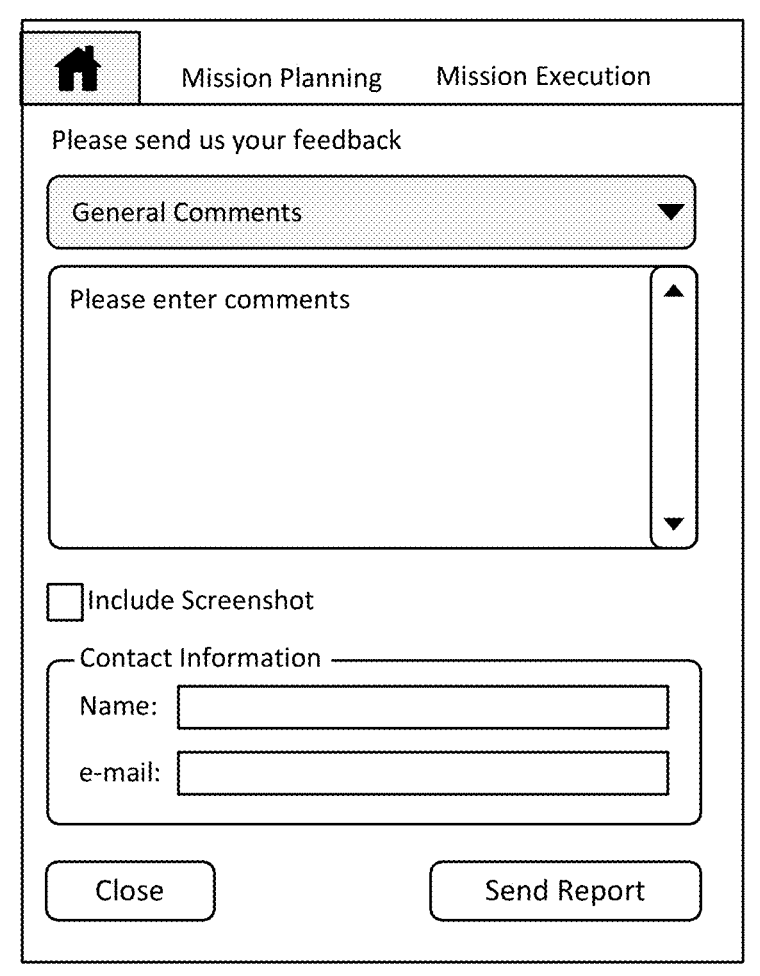

In some examples, a user feedback mechanism may be provided to encourage feedback from users. An example user display is depicted in FIG. 8.

Figure 9:
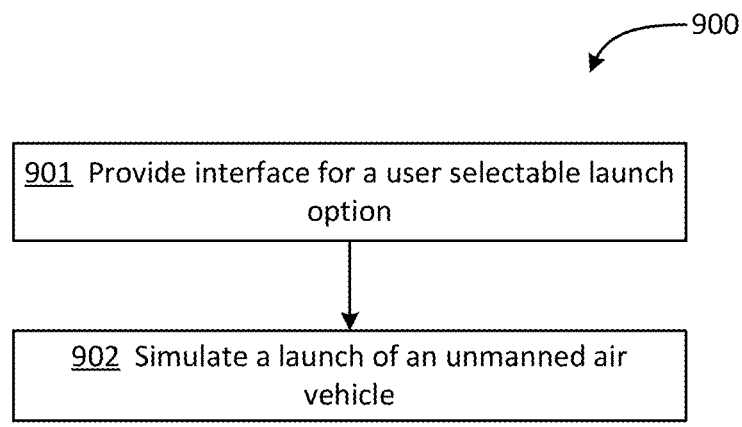
FIG. 9 depicts an example of an operational procedure for providing a quick launch function.

FIG. 9 depicts an example of a method 900 including steps of simulating a launch of an unmanned air vehicle. At block 901, an interface for a user selectable launch option for a plurality of simulation modes is provided. At block 902, responsive to a user input at the interface, a launch of an unmanned air vehicle into an orbit using a predefined launch model and orbit parameters is simulated. In some examples, the user input may be a mouse click. In other examples, the user input may be an input received via an application programming interface (API). Additionally, the predefined launch model may be a pneumatic launcher or a catapult launcher. In some examples, the orbit parameters may include an altitude and radius. Additionally, the plurality of simulation modes may include a training mode, testing mode, and planning mode.

Figure 10:
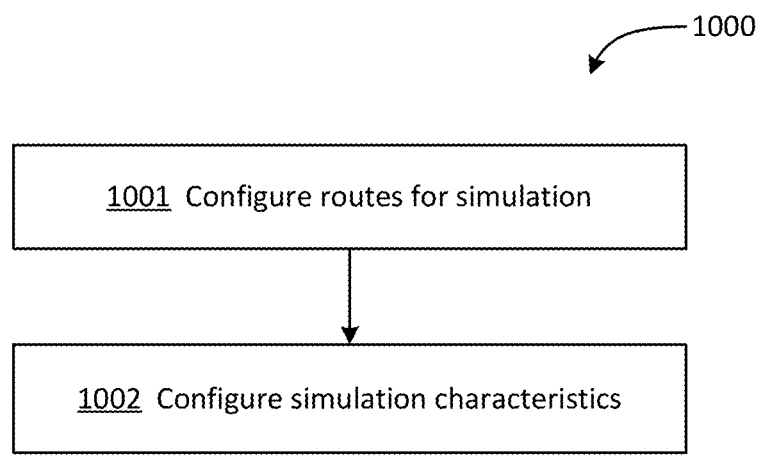
FIG. 10 depicts an example of an operational procedure for simulating a launch of an unmanned air vehicle.

FIG. 10 depicts an example of a method 1000 including steps of simulating a launch of an unmanned air vehicle. At block 1001, one or more routes for the simulation is configured. In one example, the one or more routes comprise a plurality of obstacles or terrains and a number of waypoints. A route name or a route description may be included. At block 1002, simulation characteristics of the entity during the route are configured. In one example, the simulation characteristics comprise a speed or altitude and a land or air type vehicle or entity or a model of the vehicle or entity.

Figure 11:
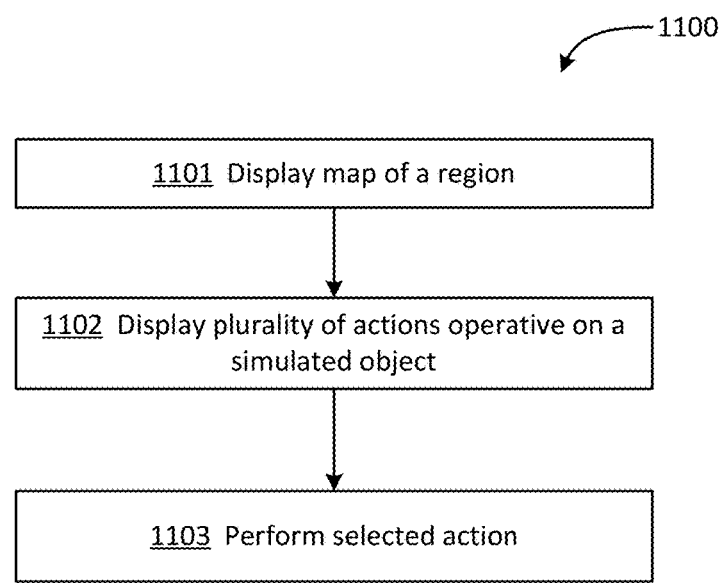
FIG. 11 depicts an example of an operational procedure for providing a point and click modification function.

FIG. 11 depicts an example of a method 1100 including steps of simulating an object. At block 1101, a map of a region is displayed. At block 1102, responsive to a single user input selecting a location on said map, a plurality of actions operative on a simulated object is displayed. At block 1103, a selected action from said plurality of actions is performed. The single user input may be a mouse click. In some examples, the displayed plurality of actions may include placing the simulated object at the selected location, removing an object from the selected location, creating the simulated object, and/or changing the location of the simulated object. Furthermore, the simulated object may be one of a target, thermal, launcher, air vehicle, land vehicle, water vessel, or skyhook. In some examples, the selected action may be operative on simulated objects of the same type. Additionally, the selected action may be performed at the selected location.

Figure 12:
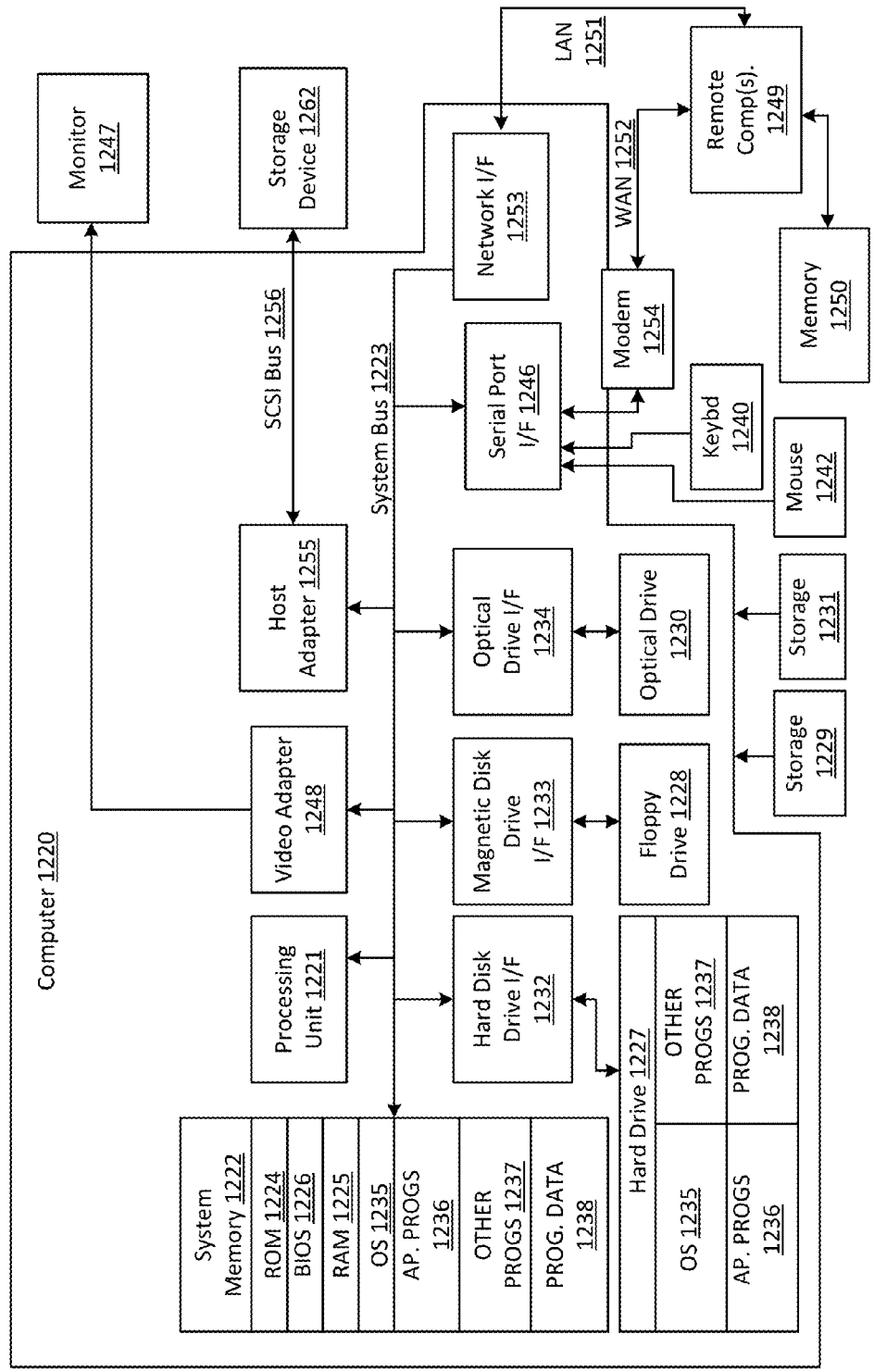
FIG. 12 depicts an illustration of an example computing environment in which operations according to the disclosed subject matter may be performed.

FIG. 12 and the following discussion are intended to provide a brief general description of a suitable computing environment in which the methods and systems disclosed herein and/or portions thereof may be implemented. For example, the functions of server 304, laptop 306, desktop 308, flight planning system 302, and database 326 may be performed by one or more devices that include some or all of the aspects described in regard to FIG. 12. Some or all of the devices described in FIG. 12 that may be used to perform functions of the claimed examples may be configured in other devices and systems such as those described herein. Alternatively, some or all of the devices described in FIG. 12 may be included in any device, combination of devices, or any system that performs any aspect of a disclosed example.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 12 is a block diagram representing a general purpose computer system in which aspects of the methods and systems disclosed herein and/or portions thereof may be incorporated. As shown, the example general purpose computing system includes computer 1220 or the like, including processing unit 1221, system memory 1222, and system bus 1223 that couples various system components including the system memory to processing unit 1221. System bus 1223 may be any of several types of bus structures including a memory bus or memory controller, a peripheral bus, and a local bus using any of a variety of bus architectures. The system memory may include read-only memory (ROM) 1224 and random access memory (RAM) 1225. Basic input/output system 1226 (BIOS), which may contain the basic routines that help to transfer information between elements within computer 1220, such as during start-up, may be stored in ROM 1224.

Computer 1220 may further include hard disk drive 1227 for reading from and writing to a hard disk (not shown), magnetic disk drive 1228 for reading from or writing to removable magnetic disk 1229, and/or optical disk drive 1230 for reading from or writing to removable optical disk 1231 such as a CD-ROM or other optical media. Hard disk drive 1227, magnetic disk drive 1228, and optical disk drive 1230 may be connected to system bus 1223 by hard disk drive interface 1232, magnetic disk drive interface 1233, and optical drive interface 1234, respectively. The drives and their associated computer-readable media provide nonvolatile storage of computer-readable instructions, data structures, program modules and other data for computer 1220.

Although the example environment described herein employs a hard disk, removable magnetic disk 1229, and removable optical disk 1231, it should be appreciated that other types of computer-readable media that can store data that is accessible by a computer may also be used in the example operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 1227, magnetic disk 1229, optical disk 1231, ROM 1224, and/or RAM 1225, including an operating system 1235, one or more application programs 1236, other program modules 1237 and program data 1238. A user may enter commands and information into the computer 1220 through input devices such as a keyboard 1240 and pointing device 1242. Other input devices (not shown) may include a microphone, joystick, game pad, satellite disk, scanner, or the like. These and other input devices are often connected to the processing unit 1221 through a serial port interface 1246 that is coupled to the system bus, but may be connected by other interfaces, such as a parallel port, game port, or universal serial bus (USB). A monitor 1247 or other type of display device may also be connected to the system bus 1223 via an interface, such as a video adapter 448. In addition to the monitor 1247, a computer may include other peripheral output devices (not shown), such as speakers and printers. The example system of FIG. 12 may also include host adapter 1255, Small Computer System Interface (SCSI) bus 1256, and external storage device 1262 that may be connected to the SCSI bus 1256.

The computer 1220 may operate in a networked environment using logical and/or physical connections to one or more remote computers or devices, such as remote computer 1249, that may represent any of server 304, laptop 306, desktop 308, flight planning system 302, and database 326. Each of server 304, laptop 306, desktop 308, flight planning system 302, and database 326 may be any device as described herein capable of performing the determination and display of zero fuel time data and return to base time data. Remote computer 1249 may be a personal computer, a server, a router, a network PC, a peer device or other common network node, and may include many or all of the elements described above relative to the computer 1220, although only a memory storage device 1250 has been illustrated in FIG. 12. The logical connections depicted in FIG. 12 may include local area network (LAN) 1251 and wide area network (WAN) 1252. Such networking environments are commonplace in police and military facilities, offices, enterprise-wide computer networks, intranets, and the Internet.

When used in a LAN networking environment, computer 1220 may be connected to LAN 1251 through network interface or adapter 1253. When used in a WAN networking environment, computer 1220 may include modem 1254 or other means for establishing communications over wide area network 1252, such as the Internet. Modem 1254, which may be internal or external, may be connected to system bus 1223 via serial port interface 1246. In a networked environment, program modules depicted relative to computer 1220, or portions thereof, may be stored in a remote memory storage device. It will be appreciated that the network connections shown are example and other means of establishing a communications link between computers may be used.

Computer 1220 may include a variety of computer-readable storage media. Computer-readable storage media can be any available tangible, non-transitory, or non-propagating media that can be accessed by computer 1220 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 1220. Combinations of any of the above should also be included within the scope of computer-readable media that may be used to store source code for implementing the methods and systems described herein. Any combination of the features or elements disclosed herein may be used in one or more examples.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed is:

1. A method for simulating an object using a computer operating according to computer instructions stored in a memory, the method comprising:
    displaying, using the computer, a map of a region;
    designing, with a designing tool, one or more routes for a simulation of an unmanned vehicle, wherein the routes comprise a plurality of obstacles or terrains and a number of waypoints; and
    simulating, with a simulation tool, the unmanned vehicle during the route;
    responsive to a single user input selecting a location on said map, dynamically determining, using the computer, a plurality of user-selectable actions, the actions determined based on a current context of the simulation of the unmanned vehicle;
    providing, using the computer, the determined plurality of user-selectable actions for display on the map of the region;
    accepting, using the computer, a user-selected action from the displayed plurality of actions; and
    performing, using the computer, the user-selected action by updating the simulating of the unmanned vehicle based on the user-selected action;
    wherein the plurality of user-selectable actions include:
        creating a further simulated object at the selected location on the map.

2. The method of claim 1, wherein said single user input consists of a mouse click.

3. The method of claim 1, wherein the simulated object comprises one of a target, thermal, launcher, air vehicle, land vehicle, water vessel, or skyhook.

4. The method of claim 1, wherein said user-selected action is operative on one or more simulated objects of a same type including a land type and an air type.

5. The method of claim 1, wherein the plurality of user-selectable actions are provided for user selection grouped according to:
    map actions altering the display of the map;
    target actions; and
    simulation actions.

6. The method of claim 5, wherein the user-selectable actions comprise moving a simulated location of the unmanned vehicle to the selected location faster than by simulation.

7. The method of claim 1, further comprising:
    checking to determine whether the user-selected action is permitted at the selected location on the map; and
    providing a warning if the user-selected action is not permitted.

8. The method of claim 1, wherein the simulating of the unmanned vehicle performed according to a start-up file and the updating of the simulating of the unmanned vehicle is performed without the start-up file.

9. A system comprising at least one memory having stored therein computer instructions that, upon execution by one or more processors of the system, at least cause the system to:
    display a map of a region;

design, with designing tool, one or more routes for a simulation of an unmanned vehicle, wherein the routes comprise a plurality of obstacles or terrains and a number of waypoints; and simulate, with a simulation tool, the unmanned vehicle during the route;

responsive to a single user input selecting a location on said map dynamically determine a plurality of user-selectable actions, the user-selectable actions determined based on a current context of the simulation of the unmanned vehicle;

provide the determined plurality of user-selectable actions for display on the map of the region;

accept a user-selected action from the displayed user-selectable plurality of actions; and perform the user-selected action by updating the simulation of the unmanned vehicle based on the user-selected action;

wherein the plurality of user-selectable actions include: creating a further simulated object at the selected location on the map.

10. The system of claim 9, wherein said single user input consists of a mouse click.

11. The system of claim 9, wherein the simulated object comprises one of a target, thermal, launcher, air vehicle, land vehicle, water vessel, or skyhook.

12. The system of claim 9, wherein said user-selected action is operative on one or more simulated objects of a same type including a land type and an air type.

13. A non-transitory computer-readable storage medium having stored thereon computer-readable instructions, the computer-readable instructions comprising instructions that upon execution on one or more computing devices, at least cause the one or more computing devices to implement:

display of a map of a region;

design, with designing tool, one or more routes for a simulation of an unmanned vehicle, wherein the routes comprise a plurality of obstacles or terrains and a number of waypoints; and simulate, with a simulation tool, the unmanned vehicle during the route;

responsive to a single user input selecting a location on said map, dynamically determining a plurality of actions, the actions determined based on a current context of the simulation of the unmanned vehicle;

providing the determined plurality of actions for display on the map of the region;

accepting a user-selected action from the displayed plurality of actions; and performing the user-selected action in real-time by updating the simulation based on the selected action;

wherein the plurality of user-selectable actions include: creating a further simulated object.

14. The computer-readable storage medium of claim 13, wherein said single user input consists of a mouse click.

15. The computer-readable storage medium of claim 13, wherein the simulated object comprises one of a target, thermal, launcher, air vehicle, land vehicle, water vessel, or skyhook.

16. The computer-readable storage medium of claim 13, wherein said user-selected action is operative on one or more simulated objects of a same type including a land type and an air type.

* * * * *